United States Patent [19]
Forsythe

[11] 3,918,727
[45] Nov. 11, 1975

[54] ORTHOPEDIC PIN HOLDER
[75] Inventor: Alan K. Forsythe, Vashon, Wash.
[73] Assignee: Hazleton Laboratories, Inc., Vienna, Va.
[22] Filed: Apr. 16, 1974
[21] Appl. No.: 461,305

[52] U.S. Cl. ................................................ 279/50
[51] Int. Cl.² ........................................ B23B 31/12
[58] Field of Search ............ 279/50, 51, 37, 43, 47, 279/57, 71

[56] References Cited
UNITED STATES PATENTS

| | | | |
|---|---|---|---|
| 633,852 | 9/1899 | Kendrick | 279/50 |
| 2,588,160 | 3/1952 | Post | 279/71 |
| 3,273,907 | 9/1966 | Voderberg et al. | 279/50 X |

Primary Examiner—Harrison L. Hinson
Assistant Examiner—Leon Gilden
Attorney, Agent, or Firm—Christensen, O'Connor, Garrison & Havelka

[57] ABSTRACT

A holder suitable for holding a long thin object (pin) during insertion of the object is disclosed. The holder comprises a longitudinal collet mounted in a cylindrical housing. The collet has a central longitudinal aperture adapted to surround the pin. One end of the collet is unitary and the other end comprises a plurality of jaws. An adjustment ring surrounds the jaws and controls their outward expansion so as to preset an initial spacing between the jaws and the longitudinal axis. Thereafter, longitudinal movement of the housing with respect to the collet presses the jaws against the outer surface of the pin. Because the adjustment ring sets the initial spacing between the jaws, only a slight amount of longitudinal movement is required to press the jaws tightly against the pin whereby rapid engagement and disengagement of the pin by the holder is provided.

14 Claims, 9 Drawing Figures

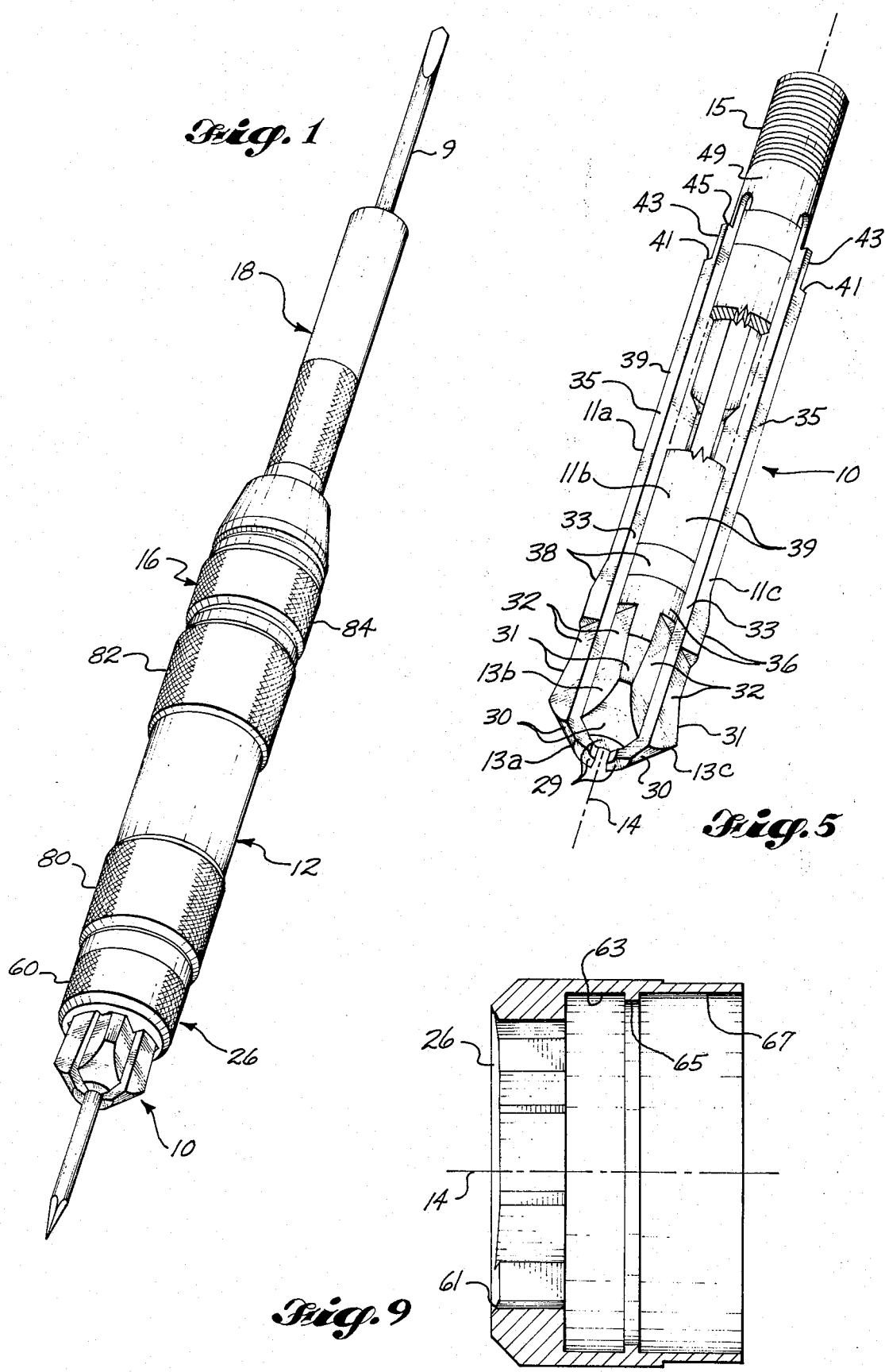

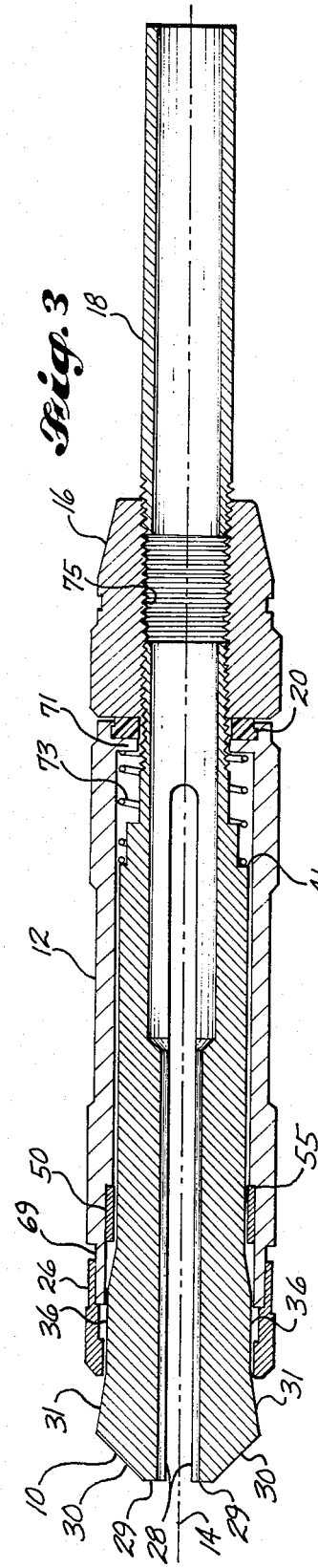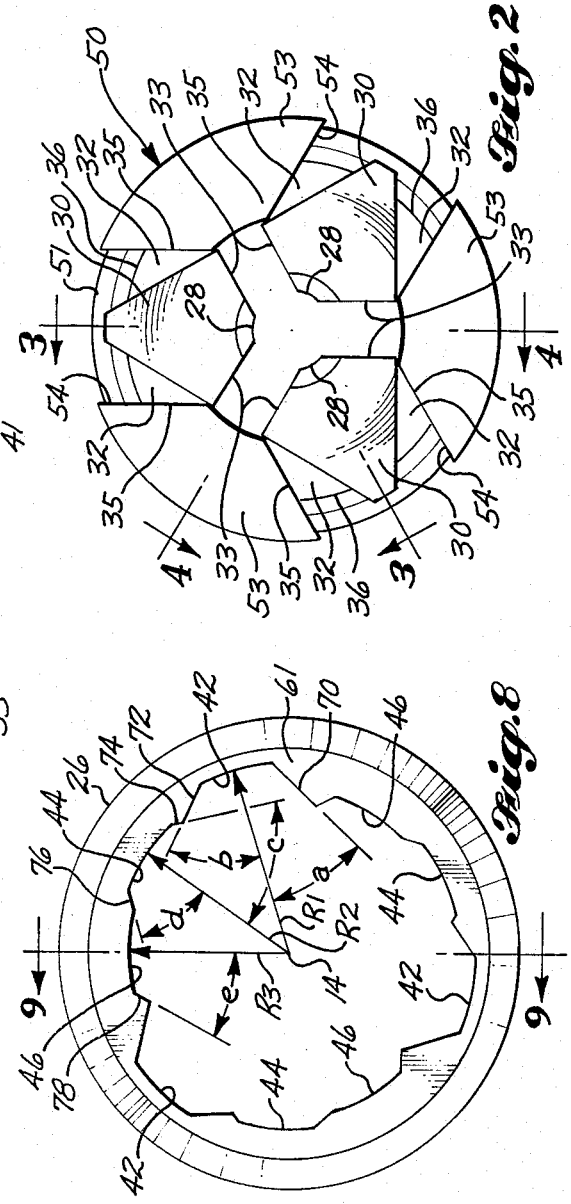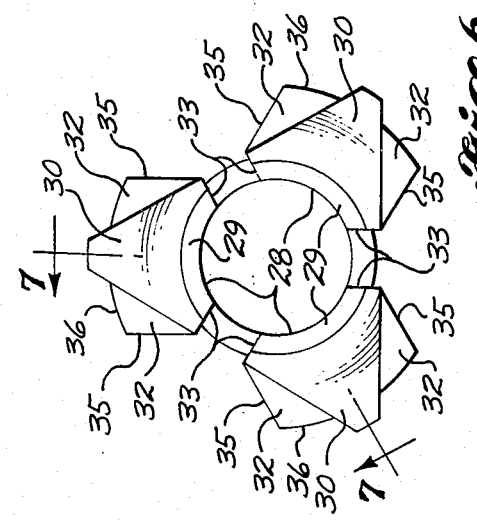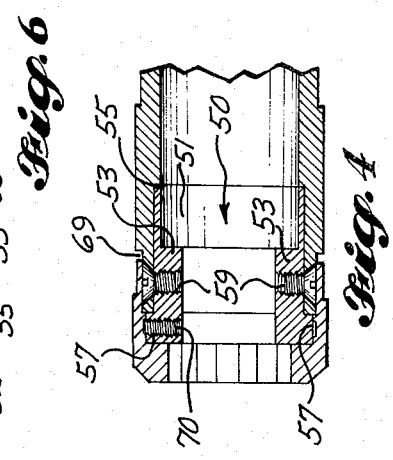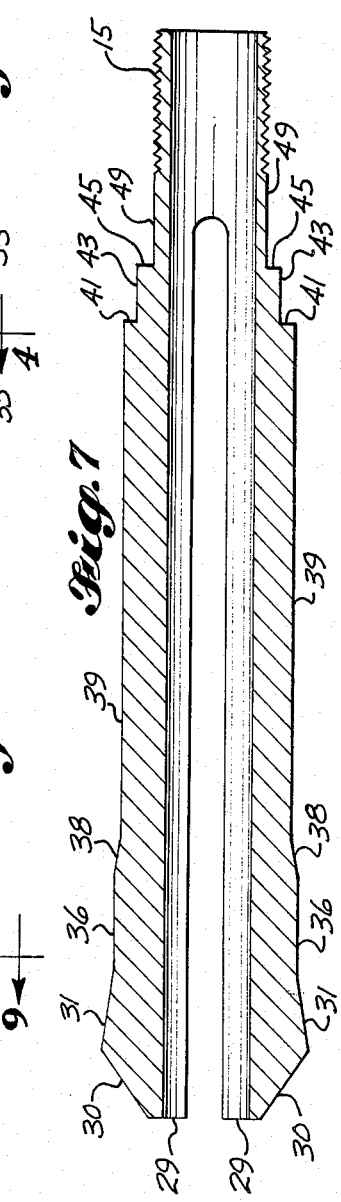

ORTHOPEDIC PIN HOLDER

BACKGROUND OF THE INVENTION

This invention is directed to holders and, more particularly, to holders suitable for holding long thin objects, such as stainless steel orthopedic intermedullary pins suitable for insertion into bones of a person or an animal.

While the herein described invention was developed for use by orthopedic medical practitioners (surgeons and veterinarians), and is described in that environment, it will be appreciated that the invention has broader applicability. For example, the invention is suitable for use in other environments where it is desired to hold long thin objects during insertion into other objects or for other purposes, and in particular in other environments where it is desired to grip long thin objects sequentially at different points along the longitudinal length of such objects. Moreover, the hereinafter described collet/adjusting ring combination is suitable for use in environments other than those wherein a long thin object is to be manipulated.

The insertion of stainless steel, and the like, pins into fractured and diseased bones for additional support as wellknown. Orthopedic surgeons have been inserting such pins into the broken necks of femurs for a number of years. More recently, interest has developed in the United States (particularly in the veterinary medicine field) regarding the insertion of relatively long pins into the medullary canal of the long bones of the body for support purposes, during healing of a fracture, for example. The utilization of such pins has been found to eliminate the necessity of casting the arm or leg associated with the fracture. Obviously, the use of such pins in animals is particularly desirable because of the difficulty of casting the broken bones of an animal, and then maintaining the animal quiet during the fracture mending period. However, the same concept is also useful with persons because a pin will not incapacitate the person to the extent that a cast will incapacitate.

As presently proposed, orthopedic pins are inserted through the cancellous bone material located at the ends of the long bones of a person or animal. In most cases, the orthopedic pin (which has a sharp or chisel tip) is directly inserted through the spongy porous cancellous bone material. During insertion the pin is rotated whereby the tip acts to some extent as a drill bit. In other cases, it may be necessary to drill a preliminary hole prior to insertion of the pin. In any event, the pin is rotated during insertion through the cancellous bone material located at one end of the bone. From this region, the pin extends through the medullary canal into the cancellous bone material located at the other end of the bone. Thus, the pin is supported at both ends and provides support across the fracture during healing. The pin may or may not be removed subsequent to healing.

It will be appreciated that a relatively long thin pin cannot be readily rotated and inserted by the mere application of manual forces to the pin itself. Thus, a mechanical holder is required. The holders used prior to the present invention have been unsatisfactory for various reasons. Many have been bulky and difficult to use. A Jacobs chuck is an example of a prior art holder having this disadvantage. Moreover, a Jacobs chuck requires the use of a key whereby it is difficult to engage and disengage, particularly when the chuck tip is near the bone ends. Another disadvantage of the Jacobs chuck, and other prior art devices, relates to the difficulty of disassembling them for cleaning and sterilization. Further, because of their mechanical nature prior art devices used for this purpose are not as rapidly releasable for movement along the longitudinal axis of the pin, as desired. More specifically, it is desirable to start insertion with the pin holder located near the pointed or chiseled tip of the pin so that an adequate amount of longitudinal and rotational pressure can be applied without bending the pin. After a short portion of the pin is inserted, it is desirable to move the pin holder a predetermined amount rearwardly along the longitudinal length of the pin prior to further insertion. This sequence (insertion—holder movement) continues until the pin is entirely inserted into the bone. Thus, it is desirable to provide a mechanism which rapidly engages the pin, yet is easily disengaged therefrom. Another disadvantage of some proposed prior art devices relates to their lack of flexibility. Specifically, a different holder is required for each size pin to be inserted. Thus, it is desirable to provide a holder that is universal in that it is suitble for inserting pins lying within a range of sizes.

Therefore, it is an object of this invention to provide a new and improved holder for holding long thin objects.

It is a further object of this invention to provide a new and improved orthopedic pin holder suitble for use by veterinarian and orthopedic surgeons for inserting pins into the bones of a person or animal.

It is yet another object of this invention to provide a new and improved holder suitable for holding long thin objects that is adapted to rapidly engage and disengage said objects so that the holder can be rapidly moved along the longitudinal length of said objects to sequentially grip said objects at different points.

It is yet another object of this invention to provide a long thin object holder suitable for rapidly gripping objects lying within a range of sizes.

SUMMARY OF THE INVENTION

In accordance with principles of this invention, a holder suitable for holding long thin objects, such as stainless steel orthopedic pins of the type inserted into the bones of humans and animals, is provided. The holder comprises a housing and a predetermined number of jaws mounted in the housing. The jaws define a longitudinal aperture through which the long thin object passes. An adjustment ring surrounds a portion of the jaws and sets the initial spacing between the jaws. Longitudinal movement between the housing and the jaws thereafter causes the jaws to tightly grip the long thin object.

In accordance with further principles of this invention, the jaws are three in number and form part of generally cylindrical collet; and, the housing is cylindrical and includes a collet guide suitable for maintaining the three jaws in a predetermined angular position with respect to a longitudinal axis defined by the housing. The adjustment ring is rotatable with respect to the longitudinal axis defined by the housing and controls the initial radial position of the three jaws with respect to such longitudinal axis.

In accordance with further principles of this invention, the adjustment ring defines three different initial jaw radial positions. Each position is established by three indentations in the adjustment ring, one for each jaw, spaced the same radial distance from the center of the adjustment ring (which lies along the longitudinal axis defined by the housing).

In accordance with yet other principles of this invention, the housing supports a control knob threaded to the collet. When the control knob is rotated, the housing is forced to move longitudinally with respect to the collet. This movement causes the jaws to move inwardly and tightly grip the long thin object.

In accordance with still other principles of this invention, the other surfaces of the ends of the jaws are inclined outwardly with respect to the longitudinal axis defined by the housing. These inclined surfaces coact with the adjustment ring in a manner such that the jaws inwardly (or outwardly) move when the housing is moved longitudinally with respect to the collet.

It will be appreciated from the foregoing brief summary that the invention comprises a holder suitable for holding a long thin object, such as an orthopedic pin. The adjustment ring allows the jaws of the collet to be preset. When preset, the separation between the jaws is just slightly greater than the outer diameter of the long thin object to be held. Thus, while the holder can slide along the longitudinal axis of the long thin object, the long thin object is only slightly spaced from the inner surfaces of the jaws of the collet. Consequently, only a slight amount of longitudinal movement between the collet and the housing is necessary to cause the jaws of the collet to grip the long thin object. Because only slight longitudinal movement is required, the jaws readily grip or release the long thin object. Because the invention is uncomplicated in nature and assembly, it can be readily disassembled for cleaning and sterilization. Further, the invention is relatively compact, whereby it is suitable for easy use by orthopedic veterinarians and surgeons. Moreover, because no chuck key is required, it is suitable for inserting orthopedic pins essentially entirely into a bone.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is an isometric view of a pin holder formed in accordance with the invention holding an orthopedic pin suitable for insertion into a bone;

FIG. 2 is an enlarged end view of the pin holder illustrated in FIG. 1, facing the jaws of the collet;

FIG. 3 is a cross sectional view along line 3—3 of FIG. 2;

FIG. 4 is a partial cross sectional view along line 4—4 of FIG. 2, the collet being eliminated for clarity;

FIG. 5 is a perspective view, partially in section, of a collet suitable for use in the pin holder illustrated in FIG. 1;

FIG. 6 is an enlarged end view of a collet formed in accordance with the invention, facing the jaws thereof;

FIG. 7 is a cross sectional view taken along line 7—7 of FIG. 6;

FIG. 8 is an enlarged end view of an adjustment ring formed in accordance with the invention and suitable for use in the pin holder illustrated in FIG. 1; and, FIG. 9 is a cross sectional view along line 9—9 of FIG. 8.

DESCRIPTION OF THE PREFERRED EMBODIMENT

FIG. 1 is an isometric view of a pin holder formed in accordance with the invention and comprises a collet 10 mounted in a generally cylindrical housing 12. The jaws of the collet 10 extend outwardly from one end of the housing 12, and the collet is cylindrical and coaxially mounted in the housing, as will be better understood from the following description. Surrounding the collet 10 adjacent the end of the housing from which the collet extends is an adjustment ring 26. Located at the other end of the housing 12 is knob 16 from which an extension tube 18 extends. The orthopedic pin 9 to be held lies along a longitudinal axis 14 defined by the housing and the collet. While the pin 9 can take on a variety of forms, a cylindrical pin having one end pointed and the other chisel shaped is illustrated in FIG. 1. The extension tube 18 is provided to protect the user from contact with the remote end of the pin and to aid the insertion there of.

While the collet 10 may take on a variety of forms, as illustrated in FIG. 5, it is preferably a generally cylindrical elongated element that includes three similar jaws 11a, 11b, and 11c, equally disposed about a longitudinal axis 14. The jaws have heads 13a, 13b and 13c located at one end of the collet 10. The other end 15 of the collet joins the jaws, and is threaded. The jaws are formed of a suitable spring steel and diverge slightly outwardly with respect to the longitudinal axis 14.

Preferably, a single housing can be used with two or more collets, each collet suitable for holding pins lying within a particular range of diameters. In one actual embodiment of the invention, one such collet (illustrated in FIGS. 2, 3 and 5) was found to be suitable for holding orthopedic pins lying within the diameter range of from 1/16 inch to ¼ inch and a second collet (illustrated in FIGS. 6 and 7) was found to be suitable for holding orthopedic pins lying within the diameter range of from ¼ to ½ inch. In any event, as illustrated in the drawings, the inner or pin gripping surfaces 28 of the jaws define circular segments. When viewed from the end, the jaw heads appear generally triangular, with flattened tips. When viewed from the side, the jaw heads start at a flat nose region 29 and taper outwardly to form broken conical surfaces 30. At a predetermined diameter, the broken conical surfaces 30 terminate, followed by cam surfaces 31 which taper or diverge inwardly toward the longitudinal axis 14. In addition, the side surfaces 32 of each of the triangle shaped jaw heads in the region of the broken conical surfaces 30 and the cam surfaces 31 are flat and extend toward the other end 15 of the collet, from their respective broken conical surfaces 30.

The side surfaces 32 extend slightly beyond the end of the cam surfaces 31. The slot surfaces 33, which diverge radially outwardly from the curved pin gripping surfaces, extend, essentially without interruption, to the other end 15 of the collet. Collet guide surfaces 35 lying in planes parallel to a plane longitudinally bisecting each jaw 11a, 11b or 11c extend from the termination of the side surfaces 32 to the other end 15 of the collet, between the slot surfaces 33 and the outer surfaces of the broken regions hereinafter described.

The cam surfaces 31 terminate at a broken tubular region 36. The broken tubular region 36 extends beyond the termination of the side surfaces 32 to an inwardly tapering broken cone region 38. The broken cone region 38 extends to a smaller broken tubular region 39. The smaller broken tubular region 39 extends a substantial distance along the mid-length of the collet to a first shoulder 41. The first shoulder defines a plane perpendicular to the longitudinal axis 14 and terminates at a still smaller broken tubular region 43. The still smaller broken tubular region 43 terminates at a second shoulder 45. The second shoulder 45 defines a second plane lying perpendicular to the longitudinal axis 14. The second shoulder 45 terminates at a final tubular region 49. In this final tubular region the jaws 11a, 11b and 11c join to form an unbroken cylinder. The outer surface of the unbroken cylinder forms the threaded, or other end 15 of the collet. Thus, one end of the collet comprises jaw heads and the other comprises a threaded cylinder.

A collet guide 50 (FIGS. 2, 3 and 4) surrounds a portion of the collet inside of the housing 12 and maintains the jaws equally spaced with respect to one another. The collet guide comprises a cylindrical region 51 which surrounds the smaller broken tubular region 39 of the collet adjacent to the broken cone region 38. Extending toward the jaw heads 13a, 13b and 13c from the cylindrical region 51 are three jaw-like elements 53. The outer peripheries of the jaw-like elements define circular segments. Guide planes 54 extend inwardly from the circular segments. The guide planes are coplanar with the collet guide surfaces 35 and, thus, the collet guide maintains the jaws in equal spaced relationship, without inhibiting the movement of the jaws toward or away from the longitudinal axis 14.

The end of the cylindrical region 51 of the collet quide 50 remote from the jaw-like elements 53 lies against a shoulder 55 formed in the inner surface of the housing 12. The outer peripheral surfaces of the jaw-like elements include ring sections 57 which lie against the tip of the housing 12. Three machine screws 59 pass radially inwardly through the housing and are threaded into the jaw-like elements, on a one-to-one basis. The machine screws maintain the collet guide in a fixed position with respect to the housing 12. Because the machine screws prevent the collet guide from rotating with respect to the housing 12, they also prevent rotational movement of the collet. The need for this result will be better appreciated from the following discussion of the adjustment ring 26.

The adjustment ring 26 surrounds the jaw heads 13a, 13b and 13c of the collet 10, and the outer ends of the collet guide 50 and the housing 12. As best illustrated in FIG. 1, the outer surface of the adjustment ring 26 is chamfered from its tip into a knurled cylindrical region 60. FIGS. 8 and 9 best illustrate the inner configuration of the adjustment ring 26. The outer tip 61 of the adjustment ring includes a plurality of spaced indentations which are formed and interact with the jaw heads 13a, 13b and 13c of the collet in the manner hereinafter described. Located immediately inwardly from the relatively thick tip 61 is a first cylindrical aperture 63. Located inwardly from the first cylindrical aperture 63 is an inwardly projecting ridge 65. Beyond the ridge 65, and extending to the other end of the adjustment ring, is a second cylindrical aperture 67. The second cylindrical aperture 67 surrounds the tip of the housing 12 in an undercut region 69 (FIGS. 3 and 4). The machine screws 59 pass through the housing 12 into the collet guide in the undercut region 69. The ridge 65 rests against the tip of the housing 12. A suitable longitudinal locking device, such as a set screw 70, is threaded through an aperture in the collet guide 50 and extends into the first cylindrical aperture 63. The set screw 70, thus, is adapted to prevent longitudinal movement of the adjustment ring 26 with respect to the housing 12 and collet guide 50 without inhibiting rotational movement.

Turning now to a description of the configuration of the inner surface of the relatively thick tip 61; as illustrated in FIG. 8, when viewed in a plane lying orthogonal to the longitudinal axis 14, the tip 61 is divided into three sets of indentations—an outer set of indentations 42; a mid-set of indentations 44 and an inner set of indentations 46. Each set includes three indentations; and, all of the indentations are connected by bevel segments. Further, all indentations are curved The indentations making up each set are equally radially spaced from the longitudinal axis 14; however, each set is at a different radial spacing. Moreover, the indentations 42, 44 or 46 making up each set of indentations are equally spaced with respect to one another; and, the indentations making up the sets are spaced between one another. For example, the indentations making up the outer set 42 are spaced between the indentations making up the other sets—the mid-set 44 and the inner set 46. A group of indentations (one from each set), plus their connecting bevel segments, cover an arc of 120°. Thus, the formation and location of the indentations are such that all three jaw heads lie in the same set of indentations. Thus, depending upon the rotational position of the adjustment ring 26 with respect to the housing 12, the jaw heads 13a, 13b and 13c may lie in the outer set of indentations 42. Rotation of the adjustment ring in a clockwise direction, as viewed in FIG. 8, with respect to the housing 12, moves the jaw heads slightly inwardly into the midset of indentations 44. Further rotation of the adjustment ring in the same direction causes the jaw heads to move further inwardly as they reach a point where they come in contact with the inner set of indentations 46. In this manner, the adjustment ring presets the jaws via the jaw heads. Final pressing of the jaws into contact with the pin is accomplished in the manner hereinafter described.

Turning now to a description of the silhouette of the adjustment ring 26 illustrated in FIG. 8; starting at a first radius, designated R1, bisecting one of the outer set of indentations 42, and moving first in a clockwise direction, this indentation terminates at a first bevel segment 70 which, when extended outwardly, forms an angle designated a with R1. Moving now from R1 in a counterclockwise direction, the same indentation 42 terminates at a second bevel segment 72 which, when extended outwardly, forms an angle designated b with R1. Continuing in a counterclockwise direction, the second bevel segment 72 terminates at a third bevel segment 74. The third bevel segment 74, when extended outwardly, forms an angle designated c with a second radius, designated R2, bisecting the adjacent indentation of the mid-set of indentations 44. The third bevel segment terminates at the adjacent end of this indentation. The other end of this indentation 44 terminates at a fourth bevel segment 76. The fourth bevel segment 76, when extended outwardly, forms an angle designated d with respect to R2. The fourth bevel segment 76 terminates at the beginning of the adjacent indentation of the inner set of indentations 46. The other end of this indentation 46 terminates at the beginning of a fifth bevel segment 78. The fifth bevel segment, when extended outwardly, forms an angle designated e with a third radius, designated R3, bisecting the adjacent indentation 46 of the inner set of indentations 46. This sequence of bevel segments and indentations then repeats twice, continuing in a counterclockwise direction. In one actual embodiment angles a and e equalled 30°, and angles b, c and d equalled 45°. In addition, the adjustment ring 26 was formed of steel both for strength and wear purposes.

As previously indicated, the housing 12 generally surrounds the collet 10. The outer surface of the housing includes two knurled regions 80 and 82 which provide gripping surfaces. One knurled region 80 is located near the adjustment ring 26, and the other is located near the knob 16. Formed in the inner surface of the housing 12 near the knob 16 is in inwardly projecting ridge 71 (FIG. 3). A coil spring 73 surrounds the collet 10 between the first shoulder 41 of the collet and the ridge 71. Located on the other side of the ridge 71 is a bushing 20, preferably formed of a low friction material such as nylon. The bushing 20 surrounds the threaded end of the collet and, preferably, is pressed into the tip of the housing 12 adjacent to the knob 16.

The knob 16 includes a knurled outer surface region 84 and a threaded, longitudinal cylindrical aperture 75 that, at one end, is screwed onto the threaded end of the collet 10. The extension tube 18 is screwed into the other end of the threaded aperture 75 formed in the knob 16.

Subsequent to setting the spacing between the jaws by the adjusting ring 26, the knob 16 is rotated so as to move the collet 10 to the right, as viewed in FIG. 3, and compress coil spring 73. This movement causes the indentations 42, 44 or 46 of the adjustment ring 26 (the exact indentations depending upon the rotational position of the adjustment ring) to coact with the cam surfaces 31 in a manner such that the jaws of the collet are forced inwardly. This action causes the pin gripping surfaces 28 of the jaws to grip the pin or other long thin element located along the longitudinal axis 14. By first rotating the adjustment ring 26 to bring the jaws quickly in near contact with the pin and subsequently rotating the knob 16 to bring the jaws in gripping contact with the pin, rapid gripping of various sized pins is accomplished. Not only is gripping rapid, release is also rapid. Moreover, only a slight amount of longitudinal movement is necessary to change from a gripping state to a non-gripping state. The coil spring 73 provides reverse pressure during release; that is, the coil spring is compressed during gripping and acts to move the collet to a non-gripping state when the knob 16 is rotated in its release direction.

It will be appreciated from the foregoing description that a holder suitable for holding orthopedic pins and other long thin objects is provided by the invention. The holder is preset to a point where the spacing between the jaw heads and the longitudinal axis is just slightly greater than the radius of the pin. Final gripping action is created by moving the collet a slight amount longitudinally with respect to the housing within which the collet is mounted. Because the holder is readily adapted to grip and then release a long thin element, it is ideally suited for sequential movement along the longitudinal length of the long thin element as the element is inserted into any suitable object, such as a bone. Moreover, because the gripping action is strong, the holder is readily adapted to rotate the pin or long thin element during insertion. If additional torque is needed, obviously, a torque arm extending outwardly at right angles to the longitudinal axis 14 can be attached to the housing 12, or extension tube 18. Finally, the nature of the holder, i.e., the number and arrangement of components, is such that it can be easily disassembled for cleaning and sterilization.

While a preferred embodiment of the invention has been illustrated and described, it will be appreciated by those skilled in the art and others that various changes can be made therein without departing from the spirit and scope of the invention. For example, collets with other than three jaws can be utilized if desired. Further, the jaws may be independent of one another, i.e., formed in a non-unitary manner. Moreover, adjustment rings including more or less than three impinging indentations per jaw can be utilized, if desired. Finally, the adjustment ring can be utilized with other types of jaws, if desired. Hence, the invention can be practiced otherwise than as specifically described herein.

I claim:
1. A holder for holding long, thin objects comprising:
   a plurality of jaws spaced about a longitudinal axis defined by said jaws;
   preset means, mounted about said jaws so as to impinge on said jaws, for controlling the distance separating said jaws from said longitudinal axis, said preset means being rotationally position adjustable with respect to said jaws without moving along said longitudinal axis, the adjusted rotational position of said preset means with respect to said jaws establishing a chosen initial spacing position between said jaws and said longitudinal axis, said chosen initial spacing position being one of a plurality of initial spacing positions; and,
   gripping control means, operatively connected to said jaws and to said preset means, for causing said preset means to move said jaws toward and away from said longitudinal axis, from the chosen initial spacing position established by said preset means.

2. A holder for holding long, thin objects comprising:
   a plurality of jaws spaced about a longitudinal axis defined by said jaws;
   preset means, mounted about said jaws so as to impinge on said jaws, for controlling the distance separating said jaws from said longitudinal axis, said preset means comprising an adjustment ring surrounding at least a portion of said jaws, and being rotationally adjustable with respect to said jaws about said longitudinal axis, said adjustment ring defining a plurality of sets of jaw impingement indentations, each of said sets including indentations equal in number to the number of said plurality of jaws, said indentations establishing chosen initial spacing positions between said jaws and said longitudinal axis, said indentations being oriented such that each jaw impinges on an indentation of the same set for each adjusted position of said adjustment ring; and,
   gripping control means, operatively connected to said jaws and to said preset means, for causing said preset means to move said jaws toward and away from said longitudinal axis, from the chosen initial spacing position established by said indentations.

3. A holder for holding long thin objects as claimed in claim 2, wherein said gripping control means comprises moving means for moving said jaws along said longitudinal axis with respect to said adjustment ring.

4. A holder for holding long thin objects as claimed in claim 3, wherein said jaws join in a unitary manner to form a collet; and, wherein said moving means comprises:
 a housing surrounding at least a portion of said collet, said adjustment ring being mounted on one end of said housing; and,
 a control knob affixed to said collet and to said housing in a manner such that said housing is longitudinally moved with respect to said collet when said control knob is actuated.

5. A holder for holding long thin objects as claimed in claim 4, wherein the jaws of said collet are elongated and are joined together at one end, the other end thereof defining jaw heads, the outer surface of said jaw heads being inclined with respect to said longitudinal axis and being surrounded by said adjustment ring.

6. A holder for holding long thin objects as claimed in claim 5, wherein said unitary end of said collet is threaded; and, wherein said control knob includes a threaded aperture screwed onto said collet, a peripheral surface of said control knob pressing against said housing in a manner such that when said control knob is rotated said collet moves longitudinally with respect to said housing.

7. A holder for holding long thin objects as claimed in claim 6, including a coil spring surrounding said collet inside of said housing, one end of said coil spring impinging on said collet and the other end impinging on said housing in a manner such that said coil spring is compressed when said control knob is rotated in one direction.

8. A holder for holding long thin objects as claimed in claim 7 including:
 a collet guide mounted in said housing and surrounding said collet so as to maintain a predetermined separation between the jaws of said collet uniform regardless of the spacing between said jaws and said longitudinal axis; and,
 an extension tube attached to said control knob so as to lie along said longitudinal axis and extend outwardly from said control knob on the side thereof remote from the side containing the peripheral surface impinging on said housing.

9. In an apparatus including a plurality of jaws suitable for gripping an object by said jaws being moved inwardly into a gripping relationship with said object, the improvement comprising an adjustment ring surrounding said jaws, and being rotationally position adjustable with respect to said jaws, said adjustment ring including a plurality of sets of indentations, each set of indentations being located at different radial distances from the center of said adjustment ring, the number of indentations included in each set being equal in number to the number of said plurality of jaws, said indentations being located such that the outer surfaces of all of said jaws impinge on the indentations of the same set of indentations at the same time, which of said sets of indentations being impinged upon being determined by the rotational position of said ring with respect to said jaws.

10. An orthopedic pin holder suitable for holding orthopedic pins comprising:
 an elongated collet including a plurality of jaws spaced about the longitudinal axis defined by said collet, said jaws adapted to move inwardly and outwardly;
 a housing surrounding at least a portion of said elongated collet;
 an adjustment ring affixed to one end of said housing so as to surround said jaws, said adjustment ring adapted to rotate about said longitudinal axis with respect to said jaws and including a plurality of jaw impinging indentations adapted to preset the position of said jaws and thereby define the space separating said jaws from said longitudinal axis; and,
 a control mechanism mounted between said housing and said elongated collet so as to longitudinally move said elongated collet along said longitudinal axis with respect to said housing and said adjustment ring, said movement causing said adjustment ring to move said jaws inwardly or outwardly from said preset position.

11. An orthopedic pin holder as claimed in claim 10, wherein said collet jaws join together in a unitary fashion at one end, said end being threaded; and, wherein said control mechanism comprises a control knob screwed onto said threaded end of said collet so as to bring one surface of said control knob into impinging contact with said housing.

12. An orthopedic pin holder as claimed in claim 11 including an extension tube affixed to said control knob so as to extend outwardly along said longitudinal axis on the side of said control knob remote from the side of said control knob impinging on said housing.

13. An orthopedic pin holder as claimed in claim 12, including a collet guide mounted in said housing, said collet guide including jaw-like elements adapted to be located between the jaws of said collet so as to maintain equal separation between said jaws without preventing the inward and outward movement of said jaws with respect to said longitudinal axis.

14. An orthopedic pin holder as claimed in claim 13, including a coil spring mounted in said housing so as to surround said collet, one end of said coil spring impinging on said collet and the other end impinging on said housing such that said coil spring is compressed when said collet is moved in one direction with respect to said housing along said longitudinal axis.

* * * * *